United States Patent
Englehorn (10) Patent No.: US 11,078,311 B2
(45) Date of Patent: Aug. 3, 2021

(54) SINGLE-SITE CATALYST POLYOLEFIN POLYMERIZATION PROCESS

(71) Applicant: ExxonMobil Chemical Patents Inc., Baytown, TX (US)

(72) Inventor: Blu E. Englehorn, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 134 days.

(21) Appl. No.: 16/332,864

(22) PCT Filed: Sep. 27, 2017

(86) PCT No.: PCT/US2017/053675
§ 371 (c)(1),
(2) Date: Mar. 13, 2019

(87) PCT Pub. No.: WO2018/080701
PCT Pub. Date: May 3, 2018

(65) Prior Publication Data
US 2020/0024378 A1 Jan. 23, 2020

Related U.S. Application Data (60) Provisional application No. 62/412,902, filed on Oct. 26, 2016.

(51) Int. Cl.
| C08F 2/01 | (2006.01) |
| C08F 2/02 | (2006.01) |
| C08F 4/6592 | (2006.01) |
| C08F 210/16 | (2006.01) |
| C08F 110/06 | (2006.01) |

(52) U.S. Cl.
CPC .............. *C08F 110/06* (2013.01); *C08F 2/01* (2013.01); *C08F 2/02* (2013.01); *C08F 4/6592* (2013.01); *C08F 210/16* (2013.01)

(58) Field of Classification Search
CPC .. C08F 2/14; C08F 2/01; C08F 210/16; C08F 4/6592; C08F 2/02
See application file for complete search history.

(56) References Cited

U.S. PATENT DOCUMENTS

| 7,714,073 B2 | 5/2010 | Jacobsen et al. |
| 8,829,128 B2 | 9/2014 | Huhtanen et al. |
| 2007/0055028 A1 | 3/2007 | Casty et al. |
| 2008/0188635 A1 | 8/2008 | Brant et al. |
| 2010/0331501 A1 | 12/2010 | Murray et al. |
| 2016/0115266 A1 | 4/2016 | Toltsch et al. |
| 2016/0145364 A1 | 5/2016 | Alastalo et al. |

FOREIGN PATENT DOCUMENTS

| EP | 0559633 A2 | 9/1993 |
| EP | 0819706 A1 | 1/1998 |
| WO | WO 9724375 A1 | 7/1997 |
| WO | 2006/025709 A1 | 3/2006 |

*Primary Examiner* — Caixia Lu (57) ABSTRACT

Disclosed is a method for polymerizing olefins comprising passing a heterogeneous single-site catalyst to a solution or slurry polymerization reactor in the absence of pre-polymerization, wherein the polymerization reactor operates at a temperature of at least 50° C. The heterogeneous single-site catalyst may be suspended and/or dissolved in a solvent selected from the group consisting of oils, aliphatic hydrocarbons and mixtures thereof. Also, the heterogeneous single-site catalyst may be passed to the polymerization reactor at a velocity of greater than 1 m/s or 3 m/s.

18 Claims, 2 Drawing Sheets

SINGLE-SITE CATALYST POLYOLEFIN POLYMERIZATION PROCESS

PRIORITY CLAIM

This application is a National Phase Application claiming priority to PCT Application Serial No. PCT/US2017/053675 filed Sep. 27, 2017, which claims priority to and the benefit of U.S. Ser. No. 62/412,902, filed Oct. 26, 2016 and EP 162057897, filed Dec. 21, 2016 which are incorporated by reference.

FIELD OF THE INVENTION

The present disclosure relates to polymerization process useful for single-site catalysts, and more particularly to methods of adding, injecting or otherwise passing single-site catalysts to solution or slurry polymerization reactors.

BACKGROUND

Figure 1:
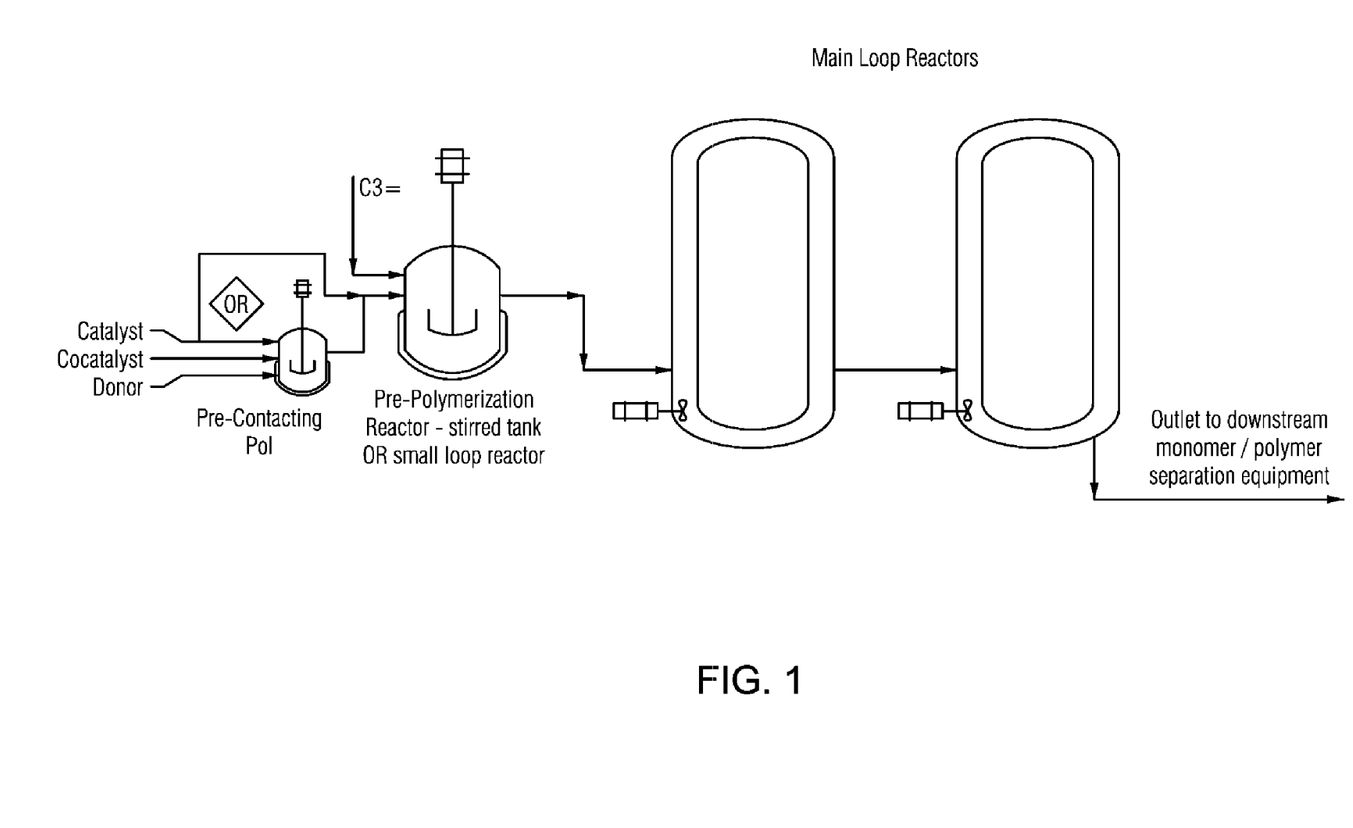
FIG. 1 is a flow diagram of a prior art solution or slurry polymerization reactor system that includes a pre-polymerization reactor.

One of the greatest challenges of new catalyst development is translating bench-scale success to commercial-scale reality. Unlike laboratory experiments, commercial reactors often present a challenge in obtaining high catalyst activity without reactor upset. One attempt to solve these problems is to pre-polymerize the catalyst with monomers prior to the catalyst entering the main polymerization reactor or zone. For example, in typical operation with bulk slurry loop polyolefin polymerization reactor processes, catalyst is "pre-polymerized" in a small reactor and typically at much lower operating temperature (10 to 30° C.) than the main reactors (e.g., the one or more full-size loop or stirred-tank reactors in series or in parallel), where the catalyst is in contact with α-olefin(s) for over 5 seconds, preferably at least 1 or 2 minutes and up to 15 or 20 minutes. Such reactors include so called "pre-contacting pots" and/or "pre-polymerization reactors". An example of such a reactor scheme is shown in FIG. 1, which includes injection points for catalyst, cocatalyst (or "activator"), and donors if needed for Ziegler-Natta type catalysts. The pre-polymerized catalyst with active polymer is then transferred into the main polymerization reactor. This pre-polymerization step is traditionally done to prevent fracturing of Ziegler-Natta type catalyst particles, traditionally supported on magnesium chloride, that would otherwise occur if the catalyst were introduced directly into a higher temperature reaction medium necessary to achieve commercial productivity, which in turn would create very fine polymer particle size that cannot be transferred through typical manufacturing plant vessels and equipment due to static fouling, particle bridging or other poor solids-flow phenomena.

It is also desirable to use metallocene and other single-sited catalysts to produce polyolefins, and specifically polypropylene, in slurry and solution processes. However, a significant problem in the use of metallocenes and other single-site catalysts in slurry and solution reactions is the high propensity for fouling of the pre-polymerization reactor and connecting piping and main reactor walls and surfaces with polymers produced with these catalysts. In some cases with other metallocene catalysts, fouling has been witnessed as thick as nearly closing the entire diameter of the pilot scale main reactors (at least 6 inch diameter piping) along the full length of the reactor walls. Due to uneven surfaces, this fouling is typically more severe at locations where equipment, such as temperature probes or other instrumentation, projects into the reaction medium or at pipe welds where the surface may be rougher or more inclined to initiate fouling buildup. The fouling is especially problematic in the areas of the reactor where the piping is jacketed for cooling of the reaction medium as the fouling prevents heat transfer and control of the reaction, or at instrument locations where fouling can interfere with proper function of the instruments leading to further control problems. This propensity to foul makes metallocene catalysts in these systems economically unattractive to use due to the need to clean the very large reactors after use, or invest significant time and money to upgrade the internal reactor surfaces to prevent fouling accumulation.

SUMMARY

Disclosed is a method comprising (or consisting of, or consisting essentially of) passing a heterogeneous single-site catalyst to a solution or slurry polymerization reactor in the absence of pre-polymerization, and contacting the catalyst with propylene monomers at a temperature of at least 50° C. The heterogeneous single-site catalyst is preferably suspended and/or dissolved in a solvent selected from the group consisting of oil, an aliphatic hydrocarbon (preferably a C6 to C20 aliphatic hydrocarbon), and mixtures thereof. Further, the heterogeneous single-site catalyst is preferably passed to the polymerization reactor at a velocity of greater than 1, or 3 m/s or more. The heterogeneous single-site catalyst can comprise any organometallic or coordination compound known to catalyze the polymerization of olefins and preferably comprises (or consists of) catalyst compounds selected from metallocenes, metal salens compounds, diamido metal compounds and alkoxide metal compounds, metal pyridyl-amides, and combinations thereof, but is preferably selected from metallocenes, and most preferably asymmetric metallocenes.

Also disclosed a polymerization reactor system comprising a polymerization reactor, a pre-polymerization reactor and a catalyst injection line fluidly connected to both and directed to by-pass the pre-polymerization reactor, in a method comprising passing a heterogeneous single-site catalyst to the catalyst injection line and contacting the heterogeneous single-site catalyst with propylene monomers in the polymerization reactor at a temperature of at least 50° C.

DETAILED DESCRIPTION

Figure 2:
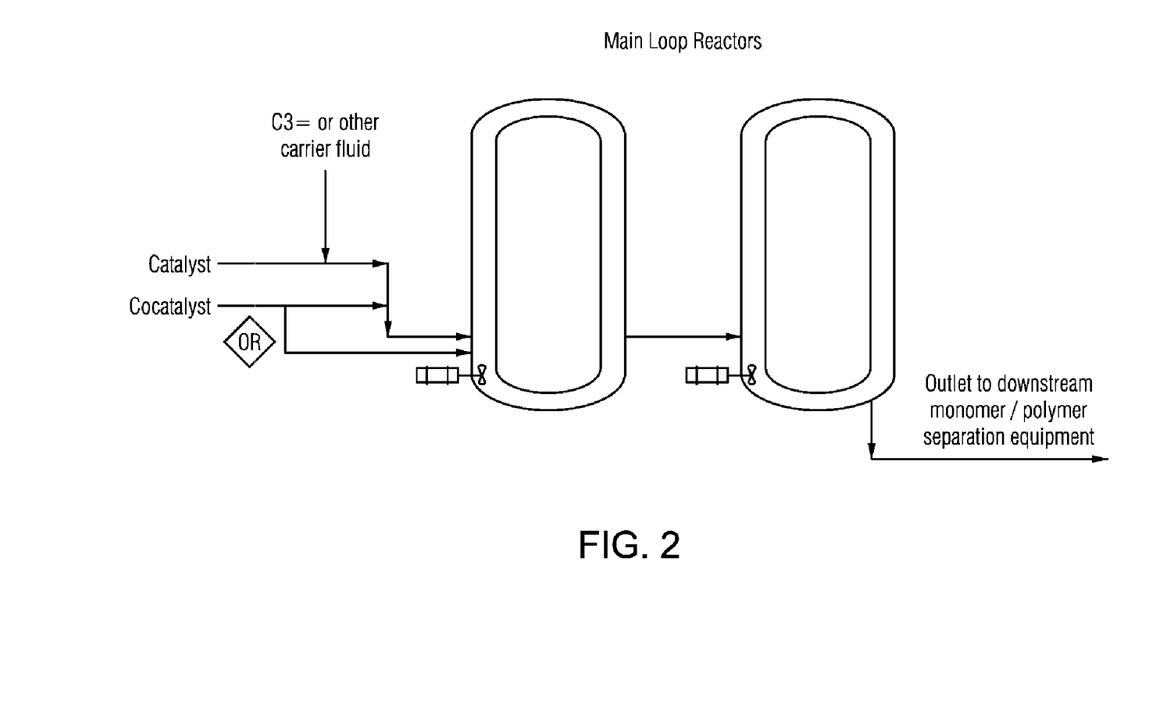
FIG. 2 is a flow diagram of the inventive solution or slurry polymerization reactor system that excludes or by-passes a pre-polymerization reactor.

It has been found that some single-site catalysts such as metallocenes supported on certain supports do not require a pre-polymerization step to prevent particle fracture and fouling in the main reactors. Thus, the invention includes a mode of slurry or solution reactor operation with the pre-polymerization reactor bypassed, or absent, by routing metallocene or other single-sited catalyst and activator feeds directly to the main loop reactor as shown in FIG. 2. This may require alteration of the catalyst feeds around existing equipment, and/or addition of catalyst injection nozzles into at least the first main loop reactor. The catalyst can be injected directly, or flushed into the reactor with a stream of monomer and/or aliphatic hydrocarbon or oil as required to support proper flow of the catalyst. The velocity of the catalyst at the injection point is preferably at least 1 (m/s) or more, more preferably greater than 3 m/s fluid velocity in the line. The line and nozzle employed are designed to meet this objective at the required catalyst flow for operational and production requirements. The reaction is thus initiated and propagated completely within the main loop reactors without any polymerization steps upstream, preventing fouling of both the now-absent pre-polymerization reactor and main polymerization reactor surfaces.

Thus disclosed in any embodiment is a method for polymerizing olefins comprising (or consisting essentially of, or consisting of) passing a heterogeneous single-site catalyst to a solution or slurry polymerization reactor in the absence of pre-polymerization, wherein the polymerization reactor operates at (i.e., the catalyst and monomers contact one another) a temperature of at least 50, or 60° C., or within a range from 50, or 60° C. to 70, or 80, or 100, or 120° C. By "absence" it is meant that the process of polymerizing olefins with the heterogeneous single-site catalyst is not carried out prior to exposing the heterogeneous single-site catalyst to olefins in a polymerization process at a temperature of at least 50° C. Preferably, the polymerization reactor is a continuous polymerization reactor, meaning that monomer can be fed into the reactor and contacted with catalyst at a constant or fluctuating rate over time and polymer product can be withdrawn at a constant or intermittent rate over time.

By "heterogeneous single-site catalyst" what is meant is an organometallic or coordination compound, or "catalyst", capable of catalyzing the formation of polyolefins from olefins and is associated with some solid, non-soluble material or "support". These elements will be described in more detail below.

In any embodiment, once passed to the polymerization reactor the heterogeneous single-site catalyst is contacted with C2 to C10, or C12 α-olefins, preferably ethylene and/or propylene, in the polymerization reactor to form polyolefin. Desirable polyolefins include polypropylenes (homopolymers, random copolymers, block copolymers, and/or impact copolymers), polyethylenes (homopolymers, random copolymers, ethylene-propylene rubber, linear low density polyethylene, high density polyethylene, and/or plastomers), and other C4 to C10 or C12 polyolefins such as polybutene, poly(butene-hexene), poly(ethylene-butene), poly(ethylene-hexene), etc.

Most preferably, the heterogeneous single-site catalyst is contacted with propylene, either alone or with from 0.1 to 5, or 10, or 20 wt %, by weight of all the monomers, of ethylene, butene, hexene, and/or octene. Desirable polypropylenes include isotactic propylene homopolymer, atactic propylene homopolymer, syndiotactic propylene homopolymer, random copolymers or so-called "tailored crystallinity propylene copolymers", impact copolymers (propylene homopolymer including heterogeneous domains of ethylene-propylene rubber), and blends of any two or more of these polymers or polymers described above. Desirable polypropylenes have a melt flow rate (ASTM D1238, 2.16 kg, 230 C) within a range from 0.1, or 0.5, or 1 g/10 min to 5, or 10, or 20, or 60, or 100, or 500 g/10 min; a weight average molecular weight (Mw) by GPC-4D within a range from 100,000, or 200,000 g/mole to 300,000), or 500,000, or 600,000, or 800,000 g/mole, and a Mw/Mn value within a range from 1.8, or 2.0 to 3.0, or 3.5, or 4.0, or 4.5, or 5, or 6.

Certain dienes may also be present as monomers in the polymerization reactor. For instance, so called "dual-polymerizable dienes" are selected from vinyl substituted strained bicyclic and unconjugated dienes, and alpha-omega linear dienes where both sites of unsaturation are polymerizable by a polymerization catalyst (e.g., Ziegler-Natta, vanadium, metallocene, etc.); and more preferably from non-conjugated vinyl norbornenes and C8-C12 alpha-omega linear dienes (e.g., 1,7-heptadiene and 1,9-decadiene). A most preferably dual-polymerizable diene is 5-vinyl-2-norbornene. So called "non-conjugated dienes" in which only one of the double bonds is activated by a polymerization catalyst may also be present and is selected from cyclic and linear alkylenes, non-limiting examples of which include 1,5-cyclooctadiene, an unconjugated diene (and other structures where each double bond is two carbons away from the other), norbornadiene, and other strained bicyclic and unconjugated dienes, and dicyclopentadiene. More preferably, the non-conjugated diene is selected from C7 to C30 cyclic non-conjugated dienes. The most preferably non-conjugated diene is 5-ethylidene-2-norbornene.

In any embodiment the invention includes reconfiguring or retrofitting a polymerization reactor system that includes a pre-polymerization reactor such that the pre-polymerization reactor is by-passed. Thus in any embodiment the inventive process includes a polymerization reactor system, or the use of a polymerization reactor system, comprising the polymerization reactor and a pre-polymerization reactor, wherein the pre-polymerization reactor is fluidly connected to the polymerization reactor, preferably in series, and wherein a catalyst injection line fluidly connected to both the pre-polymerization reactor and polymerization reactor is directed to by-pass the pre-polymerization reactor, such as by a T-valve, dual fluid lines, or some other manner of altering the flow of catalyst and/or blocking it from the pre-polymerization reactor. Thus, catalyst is passed into the catalyst injection line to the polymerization reactor without contacting monomers in the pre-polymerization reactor. Alternatively, an independent injection line can be installed in the polymerization reactor, allowing catalyst to be injected into the polymerization reactor without pre-polymerization.

Also, in any embodiment the inventive process includes a polymerization reactor system, or the use of a polymerization reactor system, comprising (or consisting essentially of, or consisting of) a polymerization reactor wherein an injection line fluidly connected to the polymerization reactor allows the heterogeneous single-site catalyst to pass directly to the polymerization reactor.

In any embodiment the heterogeneous single-site catalyst first passes through an injection nozzle into the reactor or a feed line leading to the polymerization reactor, the nozzle in any embodiment seated within tubing and having an annular space between the tubing and the nozzle. A stream selected from the group consisting of C2 to C12 α-olefins, C4 to C12 alkanes, oil, and mixtures thereof may flow through the annular space, if present, to facilitate passing the heterogeneous single-site catalyst to the polymerization reactor. Otherwise, a stream selected from the group consisting of C2 to C12 α-olefins, C4 to C12 alkanes, oil, and mixtures thereof may be used to pass the catalyst through the injector and into the polymerization reactor by force of the flow of the medium, desirably at a velocity of at least 1, or 3, or 5 m/s; or within a range from 1, or 3 m/s to 5, or 8, or 10, or 20, or 50 m/s. The contact time between any C2 to C12 α-olefins and the heterogeneous single-site catalyst is 5, or 4, or 3, or 2, or 1 second or less prior to entering the polymerization reactor and thus does not constitute "prepolymerization". In any embodiment, the C2 to C12 α-olefins may be refrigerated to a temperature of less than 20, or 10, or 0° C. prior to contacting with the catalyst. In any embodiment, the injector may pass catalyst directly into the polymerization reactor, or into an injection line fluidly connected to the polymerization reactor. The polymerization reactor system, and more particularly the polymerization reactor, can be operated in the solution mode or slurry mode.

The phrases "solution polymerization process" or "solution polymerization reactor" refer to a polymerization process or reactor wherein the monomers and forming polymers are dissolved, or mostly dissolved (less than 20, or 10, or 5, or 2 wt % of the polymer suspended or not dissolved) in a solvent comprising the monomers and optionally a solvent such as an aliphatic hydrocarbon solvent as described herein, preferably a C4 to C14 aliphatic hydrocarbon solvent. The phrases "slurry polymerization process" or "slurry polymerization reactor" refer to a process or reactor that handles polymer that is only partly dissolved or not dissolved at all in the medium, either monomer, solvent, or both, typically having at least 20 wt % polymer suspended or not dissolved.

In a typical solution or slurry polymerization process, catalyst components, solvent, monomers and hydrogen (when used) are passed under pressure to one or more polymerization reactors. Catalyst components may be passed in the inventive processes to the polymerization reactor as a mixture in aliphatic hydrocarbon solvent, in oil, a mixture thereof, or as a dry powder. The temperature of the reactor is controlled by the rate of catalyst addition (rate of polymerization), the temperature of the solvent/monomer feed stream and/or the use of heat transfer systems. For olefin polymerization, reactor temperatures can range from 50 to 120° C. or more, while pressures are generally higher than 300 psig, or within a range from 300 psig to 1000, or 1200 psig. These process conditions are in favor of in-situ catalyst activation since high temperature enhances the solubility of catalysts and activators in aliphatic hydrocarbon solvent. In any embodiment, the polymerization temperature is preferably at least 50, or 60, or 70° C., or within a range from 50, or 60, or 70, or 80, or 90, or 100, or 120° C. to 130, or 140, or 150, or 160, or 170° C.

The monomers are dissolved/dispersed in the solvent either prior to being passed to the polymerization reactor (or for gaseous monomers, the monomer may be passed to the reactor so that it will dissolve in the reaction mixture). Prior to mixing, the solvent and monomers are generally purified to remove potential catalyst poisons. The feedstock may be heated or cooled prior to delivery to the first reactor. Additional monomers and solvent may be added to the second reactor, and it may be heated or cooled. The catalysts/activators can be passed to one polymerization reactor or split between two or more reactors. In solution polymerization, polymer produced is molten and remains dissolved in the solvent under reactor conditions, forming a polymer solution. The heterogeneous single-site catalyst may be passed to the reactor in solid form or as a slurry/suspension in a solvent. Alternatively, the catalyst suspension may be premixed with the solvent in the feed stream for the polymerization reaction. Catalyst can be activated in-line, but is preferably activated by the activator with which it is supported. In some instances premixing is desirable to provide a reaction time for the catalyst components prior to entering the polymerization reactor, but this step is preferably absent. The high efficiency of heterogeneous single-site catalysts (preferably at least 20,000 kg polymer per kg of catalyst in industrial process) enables the use of very low catalyst concentration in the reactor. The catalyst activity is preferably 20,000 kg polymer per kg of catalyst or more, more preferably 50,000 kg polymer per kg of catalyst or more, even more preferably 100,000 kg polymer per kg of catalyst or more.

In any embodiment, the solution or slurry polymerization processes of this disclosure include a stirred reactor system comprising one or more stirred polymerization reactors. Generally the reactors should be operated under conditions to achieve a thorough mixing of the reactants. In a dual reactor system, the reactors may operate at the same or different temperatures and fluidly connected in series. The residence time in each reactor will depend on the design and the capacity of the reactor.

Also in any embodiment, the solution or slurry polymerization process of this disclosure uses one or more loop type of reactors, preferably two fluidly connected in series. Such reactor systems include a single reactor and multiple reactors in series or parallel configuration, such as that disclosed in US 2007/0022768. The solvent/monomer flow in these reactors is typically maintained using pumps and/or pressure systems, and may operate continuously by having monomer and catalyst feed at one point and extracting the forming polymer from another point, preferably downstream therefrom. The conditions of temperature, catalyst concentration, hydrogen concentration, and monomer concentration may be the same or different in each loop reactor and may be tailored as necessary to suit the desired end product.

In any embodiment, the solution polymerization process of this disclosure uses heat exchanger types of reactor where polymerization reaction takes place in the heat exchanger. The reactors can be one or more shell and tube type of heat exchangers, or one or more spiral type of heat exchanger.

In any embodiment, the polymer solution is then discharged from the reactor as an effluent stream and the polymerization reaction is quenched, typically with coordinating polar compounds, to prevent further polymerization. On leaving the reactor system the polymer solution is passed through a heat exchanger system on route to a devolatilization system and polymer finishing process. Under certain conditions of temperature and pressure, the polymer solution can phase separate into a polymer lean phase and a polymer rich phase. The polymer can be also recovered from the effluent by coagulation with a non-solvent such as isopropyl alcohol, acetone, or n-butyl alcohol, or the polymer can be recovered by stripping the solvent or other media with heat or steam. One or more conventional additives such as antioxidants can be incorporated in the polymer during the finishing procedure. Possible antioxidants include phenyl-beta-naphthylamine; di-tert-butylhydroquinone, triphenyl phosphate, heptylated diphenylamine, 2,2'-methylene-bis(4-methyl-6-tert-butyl)phenol, and 2,2,4-trimethyl-6-phenyl-1,2-dihydroquinoline, or stabilizing agents such as tocopherols or lactones, or other agents as disclosed in WO 2009/007265.

In any embodiment, the heterogeneous single-site catalyst is in a solution or slurry in an aliphatic hydrocarbon and/or oil solvent prior to entering the polymerization reactor. In any embodiment, the concentration of the heterogeneous single-site catalyst in the solvent prior to entering the polymerization reactor is within a range from 1, or 2, or 5 to 10, or 12, or 16, or 20 wt/o by weight of the heterogeneous single-site catalyst, activator if present and solvent, where the solvent may be the same or different than the solvent that may be used in the polymerization reactor. In any embodiment the solvent used to suspend and/or dissolve the het- erogeneous single-site catalyst is selected from the group consisting of an oil, aliphatic hydrocarbon solvent, especially one or a mixture of C6 to C20 hydrocarbons, and combinations thereof.

In any embodiment, the catalysts and activators are suspended in a high viscosity aliphatic hydrocarbon solvent (variously referred to as an "oil", "grease", or "wax", or as used herein simply "oil") prior to introduction into the polymerization feed and/or reactor. The main purpose of using an oil is to avoid catalyst/activator powder or powder from settling within the mixture in the catalyst holding vessel, delivery/storage tank and feed lines. This is particularly useful for systems without agitation or long feed lines. For a given catalyst/activator, the powder settling depends on the viscosity and density of the carrying liquid. Viscosity of the carrying medium needs to be high enough so that the drag force on a powder can overcome the gravitational force. On the other hand, the viscosity is preferably low enough so the catalyst suspension is transportable to the polymerization reactors. The viscous liquid is desirably inert to the catalyst/activator. Various types of viscous liquids or greases can be used as the "oil" in the processes disclosed herein. Examples include hydrocarbon oils, such as mineral oils; synthetic hydrocarbon oils; silicon oils; and the mixtures of thereof. Synthetic poly-alpha olefin oil (PAO), such as those disclosed in US 2013/0245344, and mineral oil (including alkanes, cycloalkanes, and mixtures thereof) are particularly preferred oils. In any embodiment, aromatic hydrocarbons are absent from the oil. In any embodiment, the preferred oils are C20 to C30, or C40, or C60, or C80, or C100), or C200 hydrocarbons. Also in any embodiment, the preferred oils have a kinematic viscosity at 40° C. in a range of 2, or 20, or 50, or 100 to 1000, or 1400, or 1600, or 1800, or 2000 cSt as measured according to ASTM D445. Aliphatic hydrocarbon solvents are C20 or below hydrocarbon compounds having a viscosity lower than that of an oil, grease or wax, especially C6 to C20 hydrocarbons.

In any embodiment the heterogeneous single-site catalyst is passed to the polymerization reactor by contacting with a stream selected from the group consisting of C2 to C12 α-olefin, C4 to C12 alkanes, oil, and mixtures thereof, which may be the same or different from the solvent used in the slurry or solution of the heterogeneous single-site catalyst. In any embodiment the heterogeneous single-site catalyst is passed to the polymerization reactor at a velocity of at least 1, or 3, or 5 m/s; or within a range from 1, or 3 m/s to 5, or 8, or 10, or 20, or 50 m/s.

In any embodiment, the heterogeneous single-site catalyst comprises (or consists of) a catalyst compound selected from metallocenes, metal salens (phenol/Schiff base ligand), diamido metal compounds and alkoxide metal compounds ("late transition metal" or "Brookhart" catalysts), metal pyridyl-amides, and combinations thereof. Preferably, the heterogeneous single-site catalyst is a "metallocene" comprising (or consists of) one or two or more ligands, preferably two ligands, selected from cyclopentadienyl and ligands isolobal to cyclopentadienyl. Most preferably, the heterogeneous single-site catalyst comprises an asymmetric metallocene, meaning that there is just one cyclopentadienyl ligand, or two cyclopentadienyls that are different from one another and/or have a different substitution pattern from one another. In any embodiment, the cyclopentadienyl group is selected from the group consisting of indenyl, fluorenyl, cyclopenta[b]naphthalenyl, cyclopenta[a]naphthalenyl, cyclopenta[l]phenanthrenyl, cyclopenta[b]anthracenyl, cyclopenta[a]anthracenyl, indeno[1,2-b]anthracenyl, dibenzo[b,h]fluorenyl, benzo[b]fluorenyl, hydrogenated versions thereof, substituted versions thereof (e.g., having groups such as alkyls, aryls, halogens or hydroxy groups pendant and bound to the cyclopentadienyl), and heterocyclic versions thereof (meaning ring structures incorporating non-carbon atoms such as oxygen, nitrogen, sulfur, etc.).

In any embodiment the single-site catalyst comprises (or consists of) metallocenes having structures represented by the following formulae:

wherein $R^2$ and $R^8$ are, independently, a C1 to C6 or C10 or C20 linear alkyl group, provided that at least one of $R^2$ and $R^8$ has at least 4 carbon atoms, preferably at least 6 carbon atoms, and preferably $R^2$ and $R^8$ have no branches at the alpha or beta positions, $R^4$ and $R^{10}$ are substituted or unsubstituted aryl groups (such as substituted or unsubstituted phenyl groups, preferably substituted phenyl groups), preferably at least one of the aryl groups is: 1) substituted at an ortho position with at least one group selected from C1 to C10 or C20 or C40 hydrocarbyls, heteroatoms, and heteroatom containing groups and/or 2) substituted at the 3', 4' or 5' position with at least one group selected from C1 to C10 or C20 or C40 hydrocarbyls, heteroatoms, and heteroatom containing groups;

M is a transition metal selected from Group 3 to 5 of the Periodic Table, preferably a Group 4 transition metal, most preferably zirconium:

T is a bridging group, typically divalent;

each X is an anionic leaving group;

each $R^1$, $R^3$, $R^5$, $R^6$, $R^7$, $R^9$, $R^{11}$, $R^{12}$, $R^{13}$, and $R^{14}$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents:
wherein either or both of $R^5$ and $R^6$ and $R^{11}$ and $R^{12}$ optionally join together to form a ring structure.

The 'T' group is a divalent group and may be selected from R'$_2$C, R'$_2$Si, R'$_2$Ge, R'$_2$CCR'$_2$, R'$_2$CCR'$_2$CR'$_2$, R'C═CR', R'C═CR'CR'$_2$, R'$_2$CSiR'$_2$, R'$_2$SiSiR'$_2$, R'$_2$CSiR'$_2$CR'$_2$, R'$_2$SiCR'$_2$SiR'$_2$, R'C═CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C═CR'GeR'$_2$, R'B, R'$_2$C—BR', R'$_2$C—BR'—CR'$_2$, R'N, R'$_2$C—NR', R'$_2$C—NR'—CR'$_2$, R'P, R'$_2$C—PR', and R'$_2$C—PR'—CR'$_2$ where each R' is independently hydrogen, hydrocarbyl, substituted hydrocarbyl, halocarbyl, substituted halocarbyl, silylcarbyl, or germylcarbyl, and two or more R' on the same atom or on adjacent atoms may join together to form a substituted or unsubstituted, saturated, partially unsaturated, or aromatic cyclic or polycyclic substituent.

Examples of preferable divalent T groups include dihydrocarbylsilylenes including dimethylsilylene, diethylsilylene, dipropylsilylene, dibutylsilylene, dipentylsilylene, dihexylsilylene, methylphenylsilylene, diphenylsilylene, dicyclohexylsilylene, methylcyclohexylsilylene, dibenzylsilylene, tetramethyldisilylene, cyclotrimethylenesilylene, cyclotetramethylenesilylene, cyclopentamethylenesilylene, divinylsilylene, and tetramethyldisiloxylene; dihydrocarbylgermylenes including dimethylgermylene, diethylgermylene, dipropylgermylene, dibutylgermylene, methylphenylgermylene, diphenylgermylene, dicyclohexylgermylene, methylcyclohexylgermylene, cyclotrimethylenegermylene, cyclotetramethylenegermylene, and cyclopentamethylenegermylene; carbylenes and carbdiyls including methylene, dimethylmethylene, diethylmethylene, dibutylmethylene, dipropylmethylene, diphenylmethylene, ditolylmethylene, di(butylphenyl)methylene, di(trimethylsilylphenyl)methylene, dibenzylmethylene, cyclotetramethylene, cyclopentamethylene, ethylene, methylethylene, dimethylethylene, trimethylethylene, tetramethylethylene, cvclopropylene, cyclobutylene, cyclopentylene, cyclohexylene, propanediyl, methylpropanediyl, dimethylpropanediyl, trimethylpropanediyl, tetramethylpropanediyl, pentamethylpropanediyl, hexamethylpropanediyl, vinylene, and ethene-1,1-diyl; boranediyls including methylboranediyl, ethylboranediyl, propylboranediyl, butylboranediyl, pentylboranediyl, hexylboranediyl, cyclohexylboranediyl, and phenylboranediyl and combinations thereof including dimethylsilylmethylene, diphenylsilylmethylene, dimethylsilylethylene, methylphenylsilylmethylene.

Most preferably, the divalent T group is CH$_2$, CH$_2$CH$_2$, C(CH$_3$)$_2$, SiMe$_2$, SiPh$_2$, SiMePh, Si(CH$_2$)$_3$, Si(CH$_2$)$_4$, Si(Me$_3$SiPh)$_2$, or Si(CH$_2$)$_5$.

In the structures above, at least one of $R^4$ and $R^{10}$ may be an aryl group substituted at 3' and 5' positions with C1 to C10 alkyl groups (such as t-butyl, sec-butyl, n-butyl, isopropyl, n-propyl, cyclopropyl, cyclobutyl, cyclopentyl, cyclohexyl, cycloheptyl, cyclooctyl, phenyl, mesityl, or adamantyl) or aryl groups and combinations thereof, wherein when $R^4$ or $R^{10}$ is a phenyl group that is further substituted with an aryl group, the two groups bound together can be joined directly or by linker groups, wherein the linker group is an alkyl, vinyl, phenyl, alkynyl, silyl, germyl, amine, ammonium, phosphine, phosphonium, ether, thioether, borane, borate, alane, or aluminate group.

When at least one of $R^4$ and $R^{10}$ is a phenyl group substituted at 3' and 5' positions, the phenyl group may also be substituted at the 4' position, preferably with a substituent is selected from (XR'$_n$)$^-$, wherein X is a Group 14, 15, 16 or 17 heteroatom having an atomic weight of 13 to 79 (preferably N, O, S, P, or Si) and R' is one of a hydrogen atom, halogen atom, a C1 to C10 alkyl group (such as methyl, ethyl, propyl, butyl, pentyl, hexyl, octyl, nonyl, decyl or an isomer thereof), or a C6 to C10 aryl group and n is 0, 1, 2, or 3; preferably (XR'$_n$)$^-$is —NR'$_2$, —SR', —OR', —OSiR'$_3$, —SiR'$_3$, or —PR'$_2$, preferably (XR'$_n$)$^-$is —NR'$_2$, —SR', —OR', —OSiR'$_3$, or —PR'$_2$, preferably (XR'$_n$)$^-$is —SR', —OR', or —OSiR'$_3$, preferably (XR'$_n$)$^-$is —NR'$_2$ or —PR'$_2$, or preferably (XR'$_n$)$^-$is —OR'; preferably where R' is a C1 to C10 alkyl group, particularly a methoxy, ethoxy, n-propoxy, isopropoxy, n-butoxy, iso-butoxy, sec-butoxy, or t-butoxy group, most particularly methoxy.

In the structures above, each "X" group may independently be selected from the group consisting of C1 to C20 hydrocarbyl radicals, hydrides, amides, alkoxides, sulfides, phosphides, halides, dienes, amines, phosphines, ethers, and a combination thereof, and two X may form a part of a fused ring or a ring system. Suitable examples for X groups include chloride, bromide, fluoride, iodide, hydride, and C1 to C20 hydrocarbyls, preferably methyl, ethyl, propyl, butyl, pentyl, hexyl, phenyl, benzyl, and all isomers thereof, or two X together are selected from C4 to C10 dienes, preferably butadiene, methylbutadiene, pentadiene, methylpentadiene, dimethylpentadiene, hexadiene, methylhexadiene, dimethylhexadiene, or from C1 to C10 alkylidenes, preferably methylidene, ethylidene, propylidene, or from C3 to C10 alkyldiyls, preferably propandiyl, butandiyl, pentandiyl, and hexandiyl. In any embodiment X is chloride or methyl.

In any embodiment, the heterogeneous single-site catalyst also comprises (or consists essentially of, or consists of) an activator. In other embodiments, the activator is contacted with the catalyst prior to entering the polymerization reactor or concurrently while the catalyst is in the polymerization reactor with monomers. In any embodiment, the "activator" comprises any compound capable of converting the catalyst precursor into an active polymerization catalyst, and preferably includes alkyl alumoxane compounds (e.g., methylalumoxane) and/or tetra(perfluorinated aromatic)borates, but more preferably comprises tetra(perfluorinated aromatic)borates. Even more preferably, the activator comprises anions selected from tetra(pentafluorophenyl)borate, tetra(perfluorobiphenyl)borate, tetra(perfluoronaphthyl)borate, and combinations thereof. In the case of anionic activators, the activator also comprises a bulky organic cation (trialkyl ammonium, trialkylmethyl), preferably dialkylanilinium cation, or triphenylmethyl cation. Most preferably the activator is an alumoxane compound, preferably supported on a solid support. In any embodiment, the heterogeneous single-site catalyst consists essentially of (or consists of) the support, activator, and single-site catalyst, especially preferred is a metallocene.

As mentioned, the heterogeneous single-site catalyst is "associated with" an insoluble, solid support material, meaning that it may be chemically bound to, or physically absorbed onto and/or in the support. In any embodiment the support is selected from the group consisting of Groups 2, 4, 13, and 14 metal oxides and mixtures thereof. Preferably the support is selected from the group consisting of silica, alumina, magnesia, titania, zirconia, and the like, and mixtures thereof; and is most preferably silica. Regardless of the chemical identity of the support, in any embodiment the support has an average surface area of from 200, or 400 to 800, or 1000, or 1200, or 1400 m$^2$/g.

The support preferably comprises silica, for example, amorphous silica, which may include a hydrated surface presenting hydroxyl or other groups which can be deprotonated to form reactive sites to anchor activators and/or catalyst precursors. Other porous support materials may optionally be present with the silica as a co-support, for example, talc, other inorganic oxides, zeolites, clays, organoclays, or any other organic or inorganic support material and the like, or mixtures thereof. Silicas that may be suitable are commercially available under the trade designations PD 14024 (PQ Corporation), D70-120A (Asahi Glass Co., Ltd. or AGC Chemicals Americas. Inc.), and the like.

When a silica support is referred to herein, the silica support (in unaltered form) comprises at least 60 wt %, 70 wt %, 80 wt %, 90 wt %, 95 wt %, 98 wt %, or 99 wt % or more of silica. The silica support may comprise up to 5 wt %, 10 wt %, 20 wt %, 30 wt %, or 40 wt % of another compound. The other compound may be any other support material discussed herein. The other compound may be a titanium, aluminum, boron, magnesium, or mixtures thereof. Additionally, the other compound may be a talc, other inorganic oxide, zeolite, clay, organoclay, or mixtures thereof. The silica support may also not include any substantial amount of any other compound, that is, the silica support may comprise less than 5 wt %, 1 wt %, 0.5 wt %, 0.2 wt %, or less of any other compound.

The support is preferably dry, that is, free of absorbed water. Drying of the support may be effected by heating or calcining above 100° C., for example, from 100° C. to 1000° C., preferably at least 200° C. The silica support may be heated to at least 130° C., or preferably within a range from 130° C. to 850° C., or 200° C. to 600° C., for a time of 1 minute to 100 hours, or more preferably from 12 hours to 72 hours, or from 24 hours to 60 hours. The calcined support material may comprise at least some groups reactive with an organometallic compound, for example, reactive hydroxyl (OH) groups to produce the supported catalyst systems of this invention.

Thus in any embodiment is a method comprising passing a silica supported metallocene catalyst suspended in an aliphatic hydrocarbon and/or oil at a velocity of at least 1 m/s to the solution or slurry polymerization reactor in the absence of pre-polymerization, and contacting the silica supported metallocene catalyst with propylene monomers at a temperature of at least 50° C. to obtain a polypropylene. In any embodiment a polymerization reactor system comprising a pre-polymerization reactor and a solution or slurry polymerization reactor fluidly connected in series is provided. In this arrangement, a fluid line allowing injected catalyst/activator to by-pass the pre-polymerization reactor is present. Alternatively, the polymerization reactor system may simply not include a pre-polymerization reactor. Desirably, the concentration of the silica supported metallocene catalyst in the aliphatic hydrocarbon and/or oil solvent prior to entering the polymerization reactor is within a range from 1 wt % to 20 wt % by weight of the silica supported metallocene catalyst (which may or may not include activator) and solvent. Also, the metallocene catalyst preferably comprises an asymmetric metallocene.

The various descriptive elements and numerical ranges disclosed herein for the inventive process can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

EXAMPLES

It has been found that some metallocene catalysts supported on certain silica-based support structures do not require a pre-polymerization step to prevent particle fracture. The metallocene precursor as part of the heterogeneous single-site catalyst was bis-dimethylsilyl-(4-(3',5'-di-tert-butyl-4'-methoxyphenyl)-2-methyl-indenyl)(4-o-Biphenyl-2-hexyl-indenyl)zirconium dichloride, supported, and using silica-supported methalumoxane (MAO) as an activator, and the polymerization reactor was a pilot scale continuous slurry reactor.

Supported MAO (sMAO) Preparation:

MAO was obtained as a 30 wt % MAO in toluene solution from Albemarle (13.5 wt % Al or 5.0 mmol/g). In a 125 mL Celstir reactor, silica was weighted and slurried into 6 times the amount of toluene (e.g., 1 g silica, 6 g toluene). Silica slurry was stirred at 500 rpm to get a homogeneous mixture. MAO (30% toluene solution) was added very slowly into the silica slurry to maintain the temperature greater than 40° C. After the completion of addition, the mixture was stirred for 30 minutes at 25° C. and 350 rpm, and then heated at 100° C. for 3 hours. The slurry was cooled to 25° C. and filtered through a medium frit. The filtrate mixed with THF-$d_8$ was analyzed with $^1$H NMR spectroscopy and no significant MAO was detected. The wet solid was washed once with 10× silica mass of toluene to remove possible unreacted MAO, then washed twice with 10 times the silica mass of hexane (e.g., if silica is 2 g, the solvent for each wash is 10×2 or 20 g), and then dried under vacuum for 3 hrs, yielding dry sMAO.

Catalyst Preparation:

In a 25 mL Celstir reactor or a 20 mL vial, sMAO (1 gram) and 5× toluene (e.g., 1 g sMAO, 5 g toluene) were added. The slurry was stirred at 350 rpm (Celstir) or place on a shaker (vial) to get a homogeneous mixture. TIBAL (neat) at an amount of 0.34 mmol/g sMAO was added slowly into the sMAO slurry and stirred for 15 minutes. Then, the metallocene was added and the mixture was stirred for 1 to 2 hours at 25° C. The slurry was filtered through a medium frit. The wet solid was washed twice with 10×sMAO of toluene to remove excess soluble catalyst, then washed once with 10×sMAO of hexane, and then dried under vacuum for 3 hours, yielding free flow solid supported catalysts.

Process:

The bulk slurry loop polymerization reactor scheme shown in FIG. 1, which includes a pre-polymerization reactor followed in series by two main loop slurry polymerization reactors, was used in a comparative example. In the comparative example, catalyst was pre-polymerized at an operating temperature along with other conditions as set forth in Table 1. The pre-polymerized catalyst with active polymer was then transferred into the first main loop polymerization reactor through a carrier line.

An inventive process example is outlined in FIG. 2 where catalyst was injected directly into the first of the two loop polymerization reactors, eliminating a pre-polymerization process.

In the comparative and inventive examples, the two bulk loop polymerization reactors were connected in series with stainless steel tubing to carry catalyst, monomer, solvent, and forming polymer from the first loop to the second loop, each loop approximately 25 gallons in volume. In both examples, the supported catalyst/activator was suspended in a mixture of oil/grease when passed into the pre-polymerization reactor or first loop polymerization reactor, while the scavenger tributylaluminum was suspended/dissolved in hexane and passed into the reactor in a separate location. Passing the supported catalyst was done using an injection velocity of 3 m/s or higher in both cases.

In the inventive example, catalyst was injected through a catalyst injection nozzle using either a ³⁄₁₆ or ¼ inch diameter stainless steel tubing through which a nozzle was inserted into the reactor such that any annular space between the tubing and the nozzle was eliminated. The nozzle extended at least to the inner wall of the first loop reactor. The supported catalyst slurry was passed into the first loop polymerization reactor using the propylene monomer feed and isopentane at the flow rate in Table 1. The contact time between the supported catalyst and propylene was less than 1 second. Other process features are as outlined in Table 1.

TABLE 1

Process Conditions for Polymerization Example and Comparative Runs

| Process condition | Unit | Comparative | Inventive |
|---|---|---|---|
| Catalyst/activator flow | cc/hr | 10 | 10 |
| Catalyst/activator concentration | wt % | 10 | 10 |
| Catalyst injection velocity | m/s | 5 (in the pre-polymerization reactor) | 5 (in the polymerization reactor) |
| Scavenger (TiBAl) | cc/min | 500 | 500 |
| Scavenger concentration | wt % | 2 | 2 |
| Propylene flow | lb/hr (kg/hr) | 120 (54) | 120 (54) |
| Hydrogen flow | mlb/hr (g/hr) | 0-2 (0-91) | 0-2 (0-91) |
| Pre-polymerization reactor temperature | ° F. (° C.) | 68 (20) | Not used |
| Pre-polymerization reactor pressure | psig (MPa) | 520 (3.58) | Not used |
| Reactor temperature | ° F. (° C.) | 158 (70) | 158 (70) |
| Reactor pressure | psig (MPa) | 500 (3.45) | 500 (3.45) |
| Bulk loop fouling in 3-5 days | Inch | ¼-½" thick | none |

In testing the mode of operation that excludes the pre-polymerization step, it was surprisingly found that with the metallocene catalyst that the main bulk slurry loop reactor wall fouling was eliminated. In testing on pilot plant facilities as shown in FIG. 2, the main reactor wall fouled during operation when including the pre-polymerization step, resulted in wall fouling of the entire inner wall surface area or of very large portions of the area with polymer of thicknesses ranging from a thin film up to ¼"(one-quarter inch) thick or more in as few as two (2) days of operation.

However, when the pre-polymerization step was bypassed, wall fouling in the main loop reactor walls was not observed along the primary heat transfer surfaces after five (5) days of continuous operation. Furthermore, only minor deposits were found at piping weld locations where the surfaces were roughest, with no propagation of fouling buildup beyond those small rough surfaces themselves. This level of fouling does not occur in continuous operation of a bulk slurry reactor.

This finding provides for immense cost savings in commercial facilities by allowing production with metallocene catalysts without the need to significantly modify the large bulk loop reactors. In such commercial operations, the following Table 2 outlines some preferred process parameters.

TABLE 2

Commercial Conditions

| Process condition | unit | Preferred range |
|---|---|---|
| Catalyst/activator Flow | cc/hr | 1-40 |
| Catalyst concentration | wt % | 5-20 |
| Catalyst/activator injection velocity | m/s | 1-10 |
| Scavenger | cc/min | 100-2000 |
| Scavenger concentration | wt % | 0.5-10 |
| Propylene flow | lb/hr | 50-250 |
| Hydrogen flow | mlb/hr | 0-100 |
| Reactor Temperature | ° F. (° C.) | 140-175 (60-80) |
| Reactor Pressure | psig | 450-600 |

In a process- or method-type claim, the phrase "consisting essentially of" means that there are no other steps or modifications that would impose a chemical change (e.g., oxidation state, coordination to the metal, etc.) to the heterogeneous single-site catalyst before it is passed to the polymerization reactor.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. In a polymerization reactor system comprising a polymerization reactor, a pre-polymerization reactor and a catalyst injection line fluidly connected to both and directed to by-pass the pre-polymerization reactor, a method comprising passing a heterogeneous single-site catalyst to the catalyst injection line and contacting the heterogeneous single-site catalyst with propylene monomers in the polymerization reactor at a temperature of at least 50° C.

2. The method of claim 1, comprising contacting the heterogeneous single-site catalyst and monomers at a temperature within a range from 50° C. to 120° C.

3. The method of claim 1, wherein the polymerization is continuous.

4. The method of claim 1, comprising passing the heterogeneous single-site catalyst to the polymerization reactor by contacting with a stream selected from the group consisting of C2 to C12 α-olefins, C4 to C12 alkanes, oil, and a mixtures thereof.

5. The method of claim 1, comprising passing the heterogeneous single-site catalyst to the polymerization reactor at a velocity of at least 1 m/s.

6. The method of claim 1, wherein the heterogeneous single-site catalyst comprises a heterogeneous single-site catalyst compound selected from metallocenes, metal salens, diamido metal compounds and alkoxide metal compounds, metal pyridyl-amides, and combinations thereof.

7. The method of claim 1, wherein the heterogeneous single-site catalyst comprises a metallocene comprising any two ligands selected from cyclopentadienyl and ligands isolobal to cyclopentadienyl.

8. The method of claim 7, wherein the cyclopentadienyl group is selected from the group consisting of indenyl, fluorenyl, cyclopenta[b]naphthalenyl, cyclopenta[a]naphthalenyl, cyclopenta[l]phenanthrenyl, cyclopenta[b]anthracenyl, cyclopenta[a]anthracenyl, indeno[1,2-b]anthracenyl, dibenzo[b,h]fluorenyl, benzo[b]fluorenyl, hydrogenated versions thereof, substituted versions thereof, and heterocyclic versions thereof.

9. The method of claim 1, wherein the heterogeneous single-site catalyst comprises an asymmetric metallocene.

10. The method of claim 1, wherein the single-site catalyst comprises metallocenes having structures represented by the following formulae:

wherein $R^2$ and $R^8$ are, independently, a C1 to C6 or C10 or C20 linear alkyl group, provided that at least one of $R^2$ and $R^8$ has at least 4 carbon atoms;

$R^4$ and $R^{10}$ are substituted or unsubstituted aryl groups;

M is a transition metal selected from Group 3 to 5 of the Periodic Table;

T is a bridging group;

each X is an anionic leaving group;

each $R^1$, $R^3$, $R^5$, $R^6$, $R^7$, $R^9$, $R^{11}$, $R^{12}$, $R^{13}$, and $R^{14}$ is, independently, hydrogen, or a hydrocarbyl, substituted hydrocarbyl, halocarbyl, substituted halocarbyl, silylcarbyl, substituted silylcarbyl, germylcarbyl, or substituted germylcarbyl substituents;

wherein either or both of $R^5$ and $R^6$ and $R^{11}$ and $R^{12}$ optionally join together to form a ring structure.

11. The method of claim 10, wherein at least one of the aryl groups of $R^4$ and $R^{10}$ is:

substituted at an ortho position with at least one group selected from C1 to C40 hydrocarbyls, heteroatoms, and heteroatom containing groups, and/or substituted at the 3', 4' or 5' position with at least one group selected from C1 to C40 hydrocarbyls, heteroatoms, and heteroatom containing groups.

12. The method of claim 1, wherein the heterogeneous single-site catalyst comprises an activator.

13. The method of claim 1, wherein the support upon which the heterogeneous single-site catalyst is associated is selected from the group consisting of Groups 2, 4, 13, and 14 metal oxides and mixtures thereof.

14. The method of claim 1, wherein the support upon which the heterogeneous single-site catalyst is associated has an average surface area of from 200 m²/g to 1400 m²/g.

15. The method of claim 1, wherein the support upon which the heterogeneous single-site catalyst is associated comprises at least 60 wt % silica.

16. The method of claim 1, comprising suspending the heterogeneous single-site catalyst in a solvent.

17. The method of claim 16, wherein the concentration of the heterogeneous single-site catalyst in the solvent prior to entering the polymerization reactor is within a range from 1 wt % to 20 wt % by weight of the heterogeneous single-site catalyst and solvent.

18. The method of claim 16, wherein the solvent is selected from the group consisting of oils, aliphatic hydrocarbons, and mixtures thereof.

* * * * *